United States Patent
Allcock et al.

[11] Patent Number: 5,965,627
[45] Date of Patent: Oct. 12, 1999

[54] BLENDS OF POLYURETHANE AND POLYPHOSPHAZENE AND THEIR USE AS FLAME-RETARDANT FOAMED COMPOSITIONS

[75] Inventors: Harry R. Allcock, State College; Michael M. Coleman, Boalsburg; Carey S. Reed, State College; Kevin S. Guigley, Bellefonte, all of Pa.

[73] Assignee: The Penn State Research Foundation, University Park, Pa.

[21] Appl. No.: 08/852,769

[22] Filed: May 7, 1997

Related U.S. Application Data

[60] Provisional application No. 60/016,321, May 7, 1996.

[51] Int. Cl.⁶ ........................................ C08L 75/00
[52] U.S. Cl. ............................. 521/137; 525/453
[58] Field of Search ............................. 525/453; 521/137

[56] References Cited

U.S. PATENT DOCUMENTS

| | | |
|---|---|---|
| 3,867,344 | 2/1975 | Frank et al. . |
| 4,042,561 | 8/1977 | De Edwardo et al. . |
| 4,880,622 | 11/1989 | Allcock et al. ............................. 424/78 |
| 4,948,648 | 8/1990 | Dadgar et al. ............................. 428/71 |
| 5,053,451 | 10/1991 | Allcock et al. ............................. 524/600 |
| 5,457,160 | 10/1995 | Allcock et al. ............................. 525/188 |

OTHER PUBLICATIONS

C.S. Reed, et al., "Thermal Stability and Compressive Strength of Calcium–Deficient Hydroxyapatite–Poly[bis-(carboxylatophenoxy)phosphazene] Composites", Chemistry of Materials, 1996, 8, 440–447.

*Primary Examiner*—Ana Woodward
*Attorney, Agent, or Firm*—Thomas J. Monahan

[57] ABSTRACT

Flame-retardant polymer blends of a polyurethane polymer or prepolymer and a poly(organophosphazene) are disclosed. Preferred poly(organophosphazenes) contain functional groups capable of reacting with isocyanate groups present during the curing of the polyurethane. The blends are preferably formulated by reacting the poly(organophosphazene) containing functional groups under conditions where some of the functional groups of the poly(organophosphazene) can react with the isocyanate groups present during the polymerization and curing of the polyurethane. These polymer blends are useful for making flame-retardant foamed articles of manufacture.

2 Claims, 2 Drawing Sheets

BLENDS OF POLYURETHANE AND POLYPHOSPHAZENE AND THEIR USE AS FLAME-RETARDANT FOAMED COMPOSITIONS

This invention claims priority to U.S. Provisional Patent Application No. 60/016,321 filed May 7, 1996.

GOVERNMENT SPONSORSHIP

This invention was made with Government support under Contract Number 42436741B awarded by the Federal Aviation Administration. The Government has certain rights in this invention.

FIELD OF THE INVENTION

The present invention relates to polymer blends containing a polyurethane and a polyphosphazene and to flame retardant articles made therefrom.

BACKGROUND OF THE INVENTION

Considerable interest exists in the development of flame-retardant polymers for a wide range of applications. Most conventional organic polymers have useful structural and mechanical properties, but are limited by their low thermo-oxidative stability. A typical example is found in polyurethanes, the many varieties of which are widely used in the aerospace and construction industries. However, polyurethanes are highly combustible. As a result, their thermal stability has been studied extensively. Three general approaches exist to reducing the flammability of polyurethanes; (1) the addition of small molecule flame retardants; (2) modification of the polyurethane structure to influence the thermal decomposition pathways; and (3) blending with other polymer systems to enhance the thermo-oxidative stability of the resulting material. Each approach has its advantages and disadvantages. The first approach, the addition of small molecule flame retardants, is relatively easy and inexpensive but suffers from the problem of migration or leaching of the small molecules out of the system. This limits their effectiveness over long periods of time. In addition, the small molecule additives may influence the decomposition reactions in a way that increases the production of smoke and toxic vapors, thus hampering emergency countermeasures and increasing the likelihood of death by inhalation. The second approach, the modification of the polymer structure, is often higher in cost and can compromise the mechanical properties. The third approach, which involves blending of the polyurethane with other polymers, could utilize a polymer that inhibits combustion by modifying the decomposition mechanism of the polyurethane, by the release of noncombustable gases, and/or by undergoing reactions during heating to create a high char yield to quench further combustion. However, the choice of suitable polymeric flame-retardants is restricted to species that allow retention of advantageous mechanical properties of the polyurethane.

In considering this third approach, flame retardant polymer blends, the phase behavior of polymer-polymer mixtures is crucial, because it strongly influences the chemical, physical and mechanical properties. Conditions governing the mixing of polymers are stringent and, it is a general rule that the probability is exceedingly low that a single phase (miscible) mixture of two randomly chosen high molar mass polymers can be obtained. Accordingly, the mixing of two polymers usually results in a grossly phase separated material. Macromolecular compatibilizers (usually block or graft copolymers) have been used to decrease the domain size of the dispersed phase and produce a more homogeneous dispersion, but ideally intimate mixing, exemplified by a single phase (miscible) mixture, is preferred. Miscible polyurethane blends are sparse, but can be designed by incorporating functional groups capable of specific intermolecular interactions. In situ chemical reactions between the two polymers in the mixture is another method to ensure intimate mixing, and, given the appropriate chemistry, numerous graft and interpenetrating networks can be designed. The solution that we present here is the use of a class of readily modified macromolecules known as poly (organophosphazenes).

Poly(organophosphazenes) form a large class of macromolecules with the general formula $(NPR_2)_n$. They contain alternating nitrogen and phosphorus atoms in the backbone and contain a wide variety of organic, organometallic, and inorganic side groups. Specific poly(organophosphazenes) have high resistance to solvents, low temperature flexibility, and good thermal stability. The primary synthesis route is through the ring-opening polymerization of molten hexachlorocyclotriphosphazene at 250° C. to form poly (dichlorophosphazene). The phosphorus-chlorine bonds in this polymer are highly responsive to macromolecular substitution by a wide range of nucleophiles to give a broad spectrum of poly(organophosphazenes). These have a wide range of properties that depend on the nature of the side groups. The polyphosphazenes useful in the instant invention are prepared according to standard techniques known to those skilled in the art of polyphosphazene preparation. Methods of preparation are further discussed in U.S. Pat. No. 4,880,622, to Allcock et al., U.S. Pat. No. 5,053,451 to Allcock et al., and U.S. No. 5,457,160 to Allcock et al (all incorporated herein by reference).

The thermo-oxidative stability at elevated temperatures is of primary interest when tailoring poly (organophosphazenes) for flame-retardant applications. The thermo-oxidative stability of one poly(organophosphazene) in particular, poly[bis(carboxylatophenoxy) phosphazene] has been examined [Reed, C. S. et al. Chem. Mater. 1996, 8, 440]. It has features which make it a good candidate for blending with polyurethanes. It was found that it undergoes cross-linking at temperatures above 200° C. with a high char yield which could quench further combustion.

Polymer blends or alloys are physical mixtures of two or more polymers. The phase behavior of polymer blends is determined essentially by the balance between unfavorable "physical" forces expressed in terms of solubility parameter differences and favorable "chemical" forces which are derived from intermolecular specific interactions. The strength of the interactions depends on the functional groups in the macromolecules. The roles played by the different functional groups in these interactions has been reported in detail for organic polymers [Coleman, M.; Graf, J. F.; Painter, P. C. *Specific Interactions and the Miscibility of Polymer Blends;* Technomics Publishing, Lancaster, Pa. 1991; Olabisi, P.; Robeson, L. M.; Shaw, M. T. Polymer-Polymer Miscibility; Academic Press: New York, 1979, p. 207 and references therein].

Polymer blends can exist as miscible one-phase systems, as semimiscible systems that have domains which exist together with phases rich in one of the constituent polymers, or as immiscible multi-phase materials systems. Many examples exist of miscible and immiscible polymer blends. An example of a miscible blend is that between polycaprolactone and poly(vinyl chloride), in which the driving force for miscibility is apparently the close matching of the solubility parameter and the presence of intermolecular hydrogen bonding between the Cl-C-H unit of the poly(vinyl chloride) and the proton-accepting character of the carbonyl group of the polycaprolactone [Coleman, M.; Graf, J. F.; Painter, P. C. *Specific Interactions and the Miscibility of Polymer Blends;* Technomics Publishing, Lancaster, Pa. 1991; Olabisi, O. *Macromolecules* 1975, 8, 316].

In the thesis of Paul E. Austin (Polyphosphazenes, New Biomaterials, Penn State University, 1984), the following polymer blends were reported: (i) [NP(OCH$_2$CF$_3$)$_2$]$_n$ (referred to as poly[bis(trifluoroethoxy)phosphazene]) with poly(methylmethacrylate), poly(vinylpyrrolidone), and phenoxy resin; and (ii) [NP(OCH3)2]n (referred to as poly[bis(methylamino)phosphazene]) with poly(vinylpyrrolidone), poly(acrylic acid), poly(vinyl alcohol), and methyl cellulose. This disclosure does not mention or suggest the possibility of blends containing polyurethane.

SUMMARY OF THE INVENTION

The present invention comprises a flame-retardant blend of a polyurethane polymer or prepolymer and a poly(organophosphazene). The polyurethane is not particularly limited and can be any polyurethane known in the art. Preferred poly(organophosphazenes) are those that comprise substituent organic groups that have one or more functional groups capable of reacting with isocyanate groups present during curing of the polyurethane. Examples of preferred poly(organophosphazenes) are those of the formula —[NP(R$^1$)$_x$(R$^2$)$_y$]$_n$— wherein x and y are>=0 such that x+y=2; n is from 3 to 100,000; and at least one of R$^1$ and R$^2$ comprises a substituent selected from the group consisting of —O(CH$_2$)$_m$CH$_3$, —NHR, —OPh, —OPhOH, —OPhCOOR, —OPhCOOH, —NHPh, —OPhR, —O—[(CH$_2$)$_m$CH$_2$—O]$_z$—R and —O—[(CH$_2$)$_m$CH$_2$—O]$_z$—RNH$_2$, wherein z is an integer of 1 to 40 and R is an alkyl group containing 1-30 carbon atoms. These polymer blends are useful for making flame-retardant foamed articles of manufacture including those used in the aerospace, construction and furniture industries.

A preferred method of formulating the blends comprises the preparation of a polyurethane/polyphosphazene foamed blend, under conditions where some of the functional groups of the poly(organophosphazene) can react with the isocyanate groups present during the polymerization and curing of the polyurethane foam. This would lead to the incorporation of the poly(organophosphazene) into the polyurethane network.

DETAILED DESCRIPTION OF THE INVENTION

Figure 1:
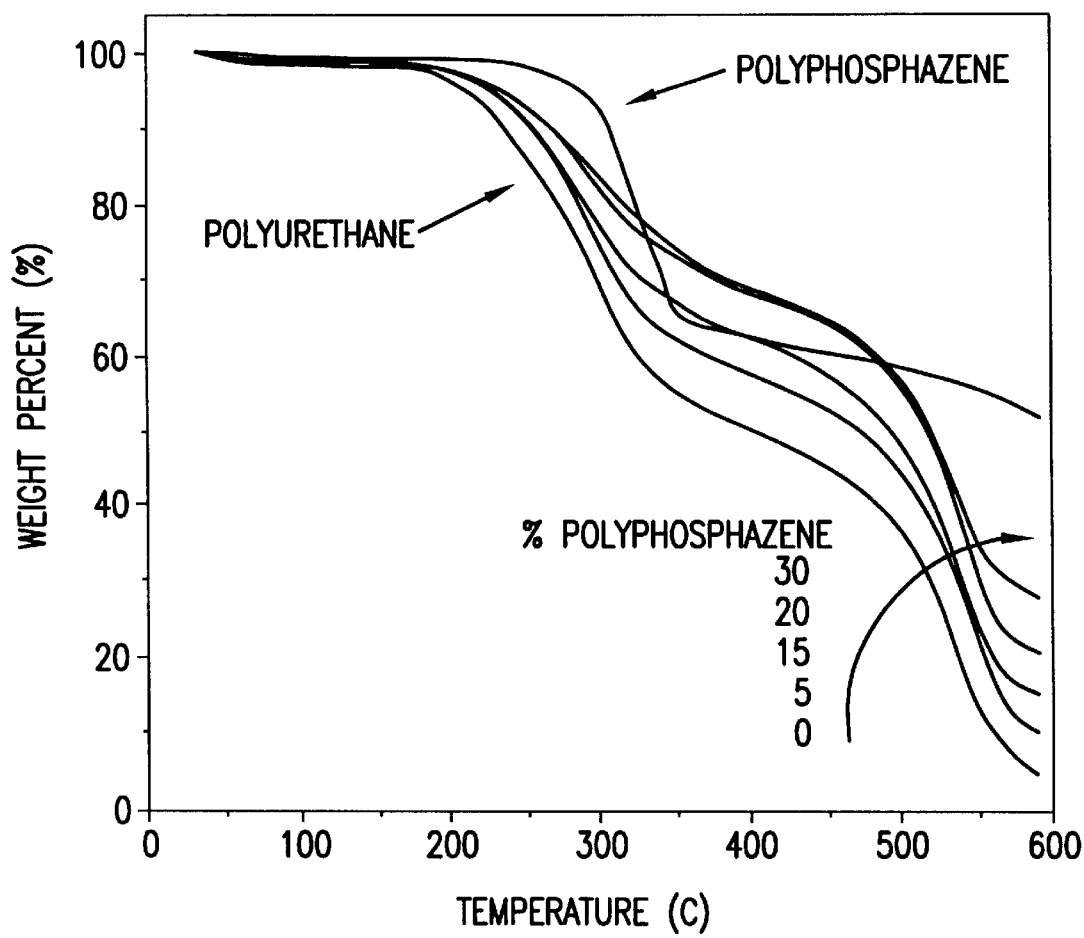
FIG. 1 shows TGA curves for polyurethane, polyphosphazene, and polyurethane/poly(organophosphazene) foams containing 5, 15, 20, and 30 wt % of poly[bis(carboxylatophenoxy)phosphazene].

The present invention comprises a flame-retardant blend of a polyurethane polymer or prepolymer and a poly(organophosphazene). The polyurethane is not particularly limited and can be any polyurethane known in the art. Preferred poly(organophosphazenes) are those that comprise substituent organic groups that have one or more functional groups capable of reacting with isocyanate groups present during curing of the polyurethane. Examples of preferred poly(organophosphazenes) are those of the formula —[NP(R$^1$)$_x$(R$^2$)$_y$]$_n$— wherein x and y are>=0 such that x+y=2; n is from 3 to 100,000; and at least one of R$^1$ and R$^2$ comprises a substituent selected from the group consisting of —O(CH$_2$)$_m$CH$_3$, —NHR, —OPh, —OPhOH, —OPhCOOR, —OPhCOOH, —NHPh, —OPhR, —O—[(CH$_2$)$_m$CH$_2$—O]$_z$—R and —O—[(CH$_2$)$_m$CH$_2$—O]$_z$—RNH$_2$, wherein z is an integer of 1 to 40, m is from 0 to 9, and R is an alkyl group containing 1-30 carbon atoms.

The ratio of x to y is not limited and will depend upon the desired properties of the polyphosphazene. The number of repeating units, n, is also not particularly limited. However, n usually ranges from 3 to about 100,000, preferably about 1,000 to 20,000, more preferably about 5,000 to 15,000 and most preferably n is about 10,000. The alkyl groups R, R$^3$ and R$^4$ can contain from 1 to 30, preferably 1 to 15 and most preferably from 1 to 5 carbon atoms. The value of m is from 0 to 9, preferably from 0 to 5 and most preferably 1 to 3.

The ratio of the polyurethane to the poly(organophosphazene) in the blends of the instant invention is also not particularly limited. Due to economic considerations, the amount of the poly(organophosphazene) will be as low as possible consistent with the desired level of flame-retardancy. Generally the blend will comprise from about 1 to 60%, by weight, of poly(organophosphazene). More preferably the amount of the poly(organophosphazene) is less than 40 wt % of the blend and most preferably it is less than 20 wt % of the blend.

Experimental Section

Materials. Hexachlorocyclotriphosphazene (Ethyl Corp./Nippon Fine Chemical Co.) was purified by recrystallization from heptane followed by sublimation at 50° C. (0.05 mmHg). Poly(dichlorophosphazene) was prepared by the normal method known to those skilled in the art [see Allcock, H.R.; Kugel, R. L. J. Am. Chem. Soc. 1965, 87, 4216 and U.S. Pat. Nos. 4,880,622 and 5,053,451, for example]. Propyl p-hydroxybenzoate (Aldrich) was purified by recrystallization from methylene chloride. Sodium hydride (60% dispersion in mineral oil, Aldrich) and potassium tert-butoxide (Aldrich) were used as received. Tetrahydrofuran (Omnisolv) was dried over sodium benzophenone ketyl and distilled under a nitrogen atmosphere. Isocyanate and hydroxyl terminated industrial polyurethane prepolymers with average molecular weight of 1000 g/mol were obtained from the Bayer Corp. The general structure of the polyurethane obtained following reaction of the prepolymers is shown below:

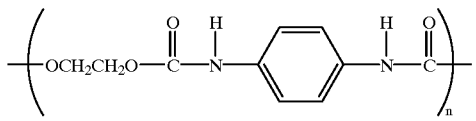

Instrumentation. $^{13}$C, $^1$H, and $^{31}$P NMR spectra were obtained with a Bruker WM-360 NMR spectrometer resonating at 90.56 MHz, 360.13 MHz, and 145.81 MHz respectively. All samples were prepared with deuterated chloroform (Isotec, 99.9%) or deuterated dimethyl sulfoxide (Isotec, 99%) as lock solvents. Molecular weights were estimated utilizing a Hewlett-Packard HP1090 gel permeation chromatograph equipped with a HP-1037A refractive index detector and a Polymer Laboratories PL gel 10 μm column calibrated with polystyrene standards (Waters) and with fractionated samples of poly[bis(trifluoroethoxy) phosphazene] provided by Drs. R. Singler and G. Hagnauer of the U.S. Army Materials Technology Laboratories, Watertown, Mass. Samples were eluted with a 0.1 wt % solution of tetra-n-butylammonium bromide in THF. Thermal weight loss measurements were made using a SSC 5200 Haak-Buchner thermogravimetric analyzer equipped with a HP model 712/60 Power Risk Station. Testing was carried out under an atmosphere of compressed air at a flow rate of 30 cm³/min and a heating rate of 10°C./min. Sample weights of 4–6 mg were analyzed.

EXAMPLE 1

Synthesis of Poly[bis(carboxylatophenoxy) phosphazene]

Poly[bis(carboxylatophenoxy)phosphazene] was prepared by the method described in U.S. Pat. No. 5,053,451. All reactions were carried out under an atmosphere of dry nitrogen utilizing standard Schlenk techniques. The precursor, -poly[bis(propyl 4-hydroxybenzoate) phosphazene], was prepared first: the sodium salt of propyl p-hydroxybenzoate was prepared by the slow addition of propyl p-hydroxybenzoate (77.7 g, 4310 mmol) in THF (500 ml) to a suspension of sodium hydride (13.8 g, 60% dispersion) in THF (800 ml). The mixture was stirred for 24 h at room temperature. A solution of poly (dichlorophosphazene) (10.0 g,862 mmol) in THF (800 ml) was added slowly to the salt solution at reflux. After 72 h at reflux, the poly[bis(propyl 4-hydroxybenzoate) phosphazene] was purified by repeated precipitation into deionized water (3 times), hexane (twice), and ethanol (once). $M_n=2.59 \times 10^6$, $M_w=3.40 \times 10^6$, pd=1.31.

A dispersion of potassium tert-butoxide (58.0 g, 517 mmol) in THF (750 ml) was cooled to 0° C. with an ice bath, before the addition of deionized water (3.0 ml) with stirring. A solution of the poly[bis(propyl 4-hydroxybenzoate) phosphazene] (10.0 g, 24.8 mmol) in THF (750 ml) was then added slowly over a period of 15 min. After 5 additional minutes at 0° C., the ice bath was removed and the mixture was allowed to warm to room temperature. The mixture was stirred at room temperature for 48 h, and then was poured into deionized water (800 ml) and purified by dialysis against deionized water (5 days). The resulting poly[bis (carboxylatophenoxy)phosphazene] polymer was then precipitated by acidification with hydrochloric acid and collected by filtration.

EXAMPLE 2

Preparation of Foams.

A predetermined quantity of poly[bis (carboxylatophenoxy)phosphazene] and the hydroxyl terminated prepolymer were placed in a tared 50 ml polyethylene beaker to achieve a total reactant weight of 8.0 grams. The mixture was hand mixed with a spatula for a period of 5–10 min. The isocyanate terminated prepolymer (8.0 g) was then added to the mixture with rapid stirring. As the reaction began to occur, the mixture was extruded between two Teflon coated steel sheets approximately 0.5 cm apart. The resultant foam formed a circular disk which was allowed to cool for 2 h. The foam disk was removed from between the steel plates and was cut into samples with uniform thickness. Foam of differing densities could be obtained by varying the initial temperature of the prepolymers before mixing. A temperature of 0° C. produced denser foams that were used in the flame testing.

EXAMPLE 3

Flame Testing

All flame tests were carried out inside a fume hood with its fan turned off and the sash down during the test to minimize external air currents. Bars of dimension 0.5 in. (1.27 cm)×5.0 in. (12.7 cm) were cut from the foam disk and marked at 0.75 in. (1.91 cm) from each end. The sample bar was placed horizontally in a clamp at a 45° angle with respect to the perpendicular of the table at a height of 15 in. (38.1 cm). A Bunsen burner using natural gas was placed in a clamp and was tilted at a 30° angle with respect to the perpendicular of the table towards the tip of the sample bar at a height of 0.5 in. (1.27 cm) below the sample. The burner was ignited away from the sample and adjusted so the flame was 0.75 in. (1.91 cm) long with the tip of the flame being slightly yellow. The burner was then moved into position directly below the sample and allowed to remain at the site until the sample burned to the first line on the sample or 30 sec, whichever occurred first, at which time the burner was removed. Once the burn front reached the first line, a timer was started, and the time of burning between the first and last mark was measured. The average burning time and extent of burning were then determined.

Figure 2:
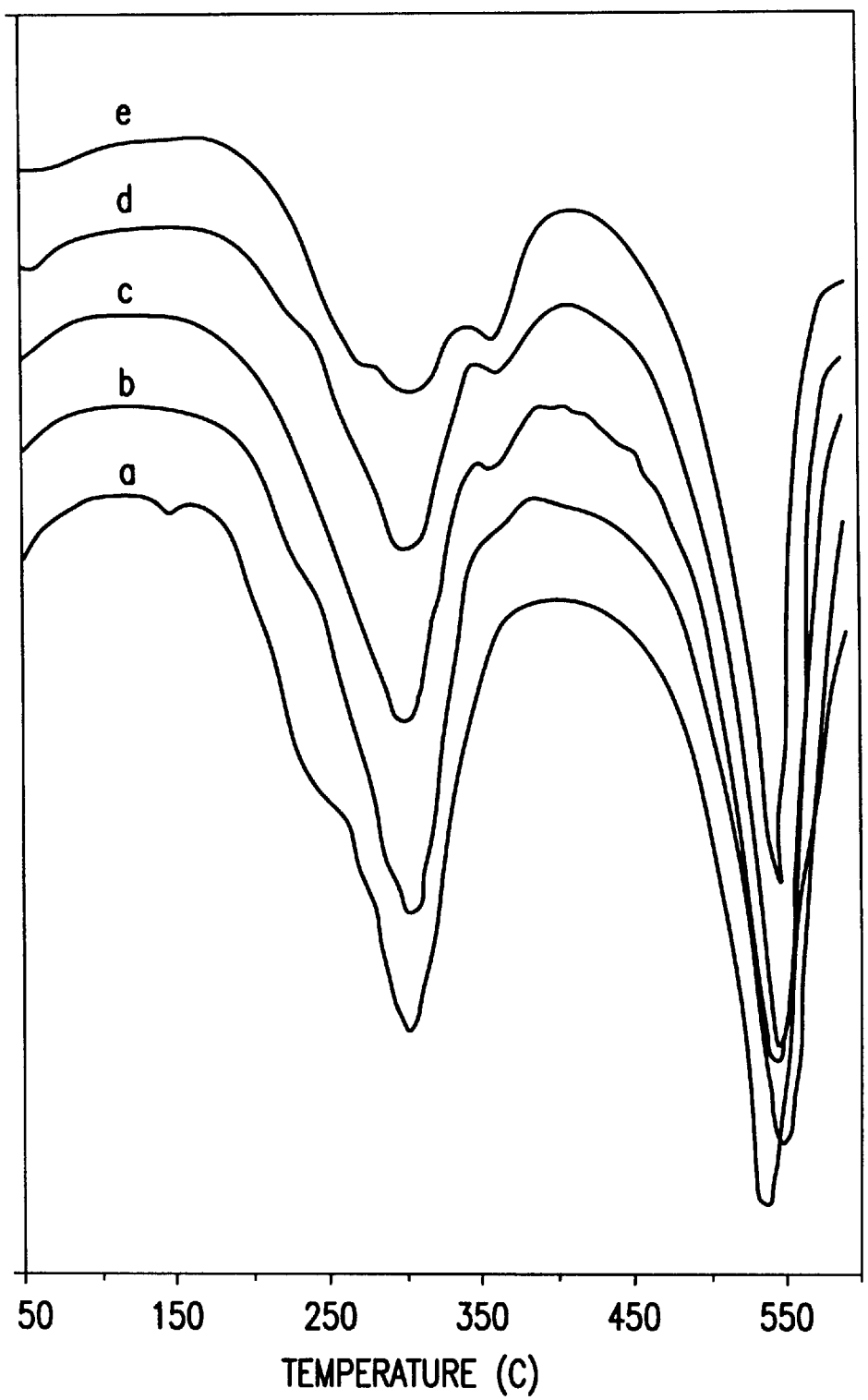
FIG. 2 shows DTG curves for a.) polyurethane foam and polyurethane/poly(organophosphazene) foams containing b.) 5, c.) 15, d.) 20, and e.) 30 wt % of poly[bis(carboxylatophenoxy)phosphazene].

The results for the flame testing of samples of a polyurethane control and a polyurethane/poly(organophosphazene) blend with 20% by weight of poly[bis(carboxylatophenoxy) phosphazene] are depicted in FIGS. 1–2. Polyurethane, in the absence of flame retardants, is extremely combustible, which is evident from FIG. 1. The polyurethane sample burned rapidly after exposure to the flame and was totally consumed within 40 sec, to leave a black char. A 5–15% loading of poly[bis(carboxylatophenoxy)phosphazene] had little effect on the overall combustibility of the samples. However, at a 20% loading of this polymer, the samples self-extinguished. Once the flame was removed after the full 30 sec limit had elapsed, the sample slowly extinguished and was completely self-extinguished after a total of 55 sec. The sample was then broken in the middle of the charred region and the internal region examined. The internal two-thirds of the charred region remained unchanged with no evidence of combustion. The outer one-third formed a black glassy char which had apparently provided a protective coating over the bulk of the sample. This charred coating provided three avenues of prevention of further combustion. First, previous work indicated that poly[bis(carboxylatophenoxy) phosphazene] releases a large amount of carbon dioxide during pyrolysis, thus increasing the percentage of noncombustible gases present. Second, this polymer is a high char yielding material, which coats the more combustible components and prevents further combustion by quenching the flame. Third, the char from poly[bis(carboxylatophenoxy) phosphazene] is a low thermal conductor of heat which generates a large thermal gradient throughout the material, and limits heat transfer to the internal bulk of the sample.

EXAMPLE 4

Thermal Analysis (a) poly[bis(carboxylatophenoxy)phosphazene]. The thermal stability of poly[bis(carboxylatophenoxy)phosphazene] has been reported [Reed, C. S.; TenHuisen, K. S.; Brown, P.

W.; Allcock, H. R. Chem. Mater. 1996, 8, 440]. This polymer, as well as other poly[bis(p-R-phenoxy) phosphazenes], where R is a polar substituent, give high char yields of 50% or more at temperatures at or above 700° C. and also undergo a high degree of cross-linking to form a dense ultrastructure. These properties are all highly desirable for flame retardant materials. In general, it was found that poly[bis(carboxylatophenoxy)phosphazene] undergoes skeletal cleavage and cross-linking reactions when heated. The onset of cross-linking occurs at 200° C. with the loss of benzoic acid, p-hydroxybenzoic acid, and the noncombustible gases carbon dioxide and water. This results in the small weight loss detected by TGA (FIG. 1). Continued pyrolysis resulted in a further 35% weight loss at 320° C., associated primarily with the loss of carbon dioxide. This is followed by the slow continuous weight loss of benzoic acid and leaving a 55% char at 600° C.

(b) polyurethane. The thermal weight loss (TGA) and differential weight loss (DTG) curves for the pure polyurethane are also shown in FIGS. 1–2. The onset of thermal degradation occurs at 200° C. It is difficult to distinguish from the TGA curve how many distinct thermal decomposition steps occur. However, from the DTG experiments, it was evident that the thermal decomposition occurred by at least three different mechanistic steps, with the first two overlapping. The maximum degradation rate temperature for the two main decomposition steps occur at 300° C. and 540° C.

(c) foamed Blends. Because the foamed blends contain relatively low percentages of poly[bis(carboxylatophenoxy) phosphazene], the TGA curves (FIG. 1) have the same general shape as those of the pure polyurethane. However, several features are of interest. The first is the onset temperature for thermal degradation of the polyurethane. The incorporation of up to 15 wt % of poly[bis (carboxylatophenoxy)phosphazene] into polyurethane had little effect on this process. However, with a 20 wt % or higher incorporation of the polyphosphazene, the onset of thermal decomposition shifted to a slightly higher temperature. The second feature of interest is the disappearance of the shoulder on the first peak of the DTG curve, evident only for the pure polyurethane, in the presence of even low percentages of the polyphosphazene. This indicates that polyphosphazene interferes with the degradation mechanism that is responsible for the shoulder. The third feature concerns the maximum degradation rate associated with the second degradation step of the polyurethane. For samples with 15 wt % or less of poly[bis(carboxylatophenoxy) phosphazene], no deviation is observed in the peak maximum. This indicates that the presence of this polymer at these percentages does not influence the maximum rate of degradation associated with the second degradation step. However, at 20 wt % loading of the polyphosphazene, the rate of degradation is affected as is evident by the shift of the peak maximum from 300 to 310° C. A shoulder also begins to develop that suggests once more that two different reaction mechanisms are occurring. As the loading of polyphosphazene is increased to 30 wt %, the peak maximum shifts further to 320° C. and the shoulder becomes more distinct. Also of interest is the appearance of a peak at 360° C. as the percentage of polyphosphazene is increased. This peak does not appear in the curves for either the polyurethane or poly[bis(carboxylatophenoxy)phosphazene] by themselves. This indicates that a degradation mechanism occurs that involves both polymers. Finally, the degradation step associated with the peak maximum at 540° C. in the DTG curve for the pure polyurethane shifts to 550° C. for all percentages of the polyphosphazene incorporation. The overall char yield at 600° C. is higher then expected based on the original composition of the samples. For instance, the sample with 30% polyphosphazene has a char yield of 30% at 600° C. Based on the data obtained for the individual components, only about 20% char yield is expected. An explanation for this is that the high char of poly[bis(carboxylatophenoxy) phosphazene] either entraps volatile molecules or limits the combustion of the polyurethane.

Polyurethane/polyphosphazene blends have been prepared from common industrial prepolymers. Their thermal degradation has been examined utilizing thermogravimetric analysis and electron-impact mass spectrometry. The flammability of the composite samples was examined by a horizontal flame test. It was determined that the presence of 15 wt % or less of the poly(organophosphazene) had little effect on the thermal degradation under the constant heating conditions of the TGA experiment and had little effect in inducing self-extinguishing behavior in the absence of an external heat source. However, the incorporation of 20 wt % of poly(organophosphazene) into the blend brought about a striking improvement. Under the constant heating conditions of the TGA experiment, the onset of decomposition and the maximum degradation rate of the first step in the decomposition pathway are increased. In addition, the composite samples have self-extinguishing properties once the external heat source is removed during flame testing. These improved properties are a result of the cross-linking of the poly (organophosphazene) which releases noncombustible gases, and the production of a protective char which quenches the overall flammability of the polyurethane.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims. In particular the invention encompasses polymer blends of a urethane polymer or prepolymer and any poly(organophosphazene) containing one or more of the indicated side groups and thus the invention is not limited to the polyphosphazene and urethane prepolymer specifically set forth in the examples.

We claim:

1. A foamed polymer blend of a polyurethane polymer and a poly(organophosphazene) prepared by curing a polyurethane prepolymer during the blending of the prepolymer and the poly(organophosphazene) and formulated under conditions where some of the functional groups of the poly (organophosphazene) react with isocyanate groups present during the curing of the polyurethane prepolymer, said poly(organophosphazene) having a formula of —[NP($R^1$)$_x$ ($R^2$)$_y$]$_n$— wherein x and y are>=0 such that x+y=2; n is from 3 to 100,000; and at least one of $R^1$ and $R^2$ comprises a substituent selected from the group consisting of —O($CH_2$)$_m$$CH_3$, —NHR, —OPh, —OPhOH, —OPhCOOR, —OPhCOOH, —NHPh, —OPhR, —O—[($CH_2$)$_m$$CH_2$O]$_z$—R and —O—[($CH_2$)$_m$$CH_2$—O]$_z$—$RNH_2$, wherein z is an integer of 1 to 40, m is from 0 to 9, and R is an alkyl group containing 1–30 carbon atoms.

2. The foamed polymer blend according to claim 1 wherein the poly(organophosphazene) is poly[bis (carboxylatophenoxy)phosphazene].

* * * * *

UNITED STATES PATENT AND TRADEMARK OFFICE
CERTIFICATE OF CORRECTION

PATENT NO. : 5,965,627  
APPLICATION NO. : 08/852769  
DATED : October 12, 1999  
INVENTOR(S) : Harry R. Allcock et al.

Page 1 of 1

It is certified that error appears in the above-identified patent and that said Letters Patent is hereby corrected as shown below:

Column 1, Line 9, after priority claim, and before "FIELD OF THE INVENTION" insert the following:

--GOVERNMENT SPONSORSHIP

This invention was made with Government support under Contract No. 95G033, awarded by the Federal Aviation Administration. The Government has certain rights in the invention.--

Signed and Sealed this

Fourteenth Day of April, 2009

JOHN DOLL  
*Acting Director of the United States Patent and Trademark Office*